United States Patent [19]

Kawabata et al.

[11] Patent Number: 5,228,933
[45] Date of Patent: Jul. 20, 1993

[54] HIGH PERFORMANCE PNEUMATIC RADIAL TIRES

[75] Inventors: Misao Kawabata, Tokorozawa; Hisao Ushikubo, Kodaira; Yutaka Yamaguchi, Urawa; Katsutoshi Tani; Hiroo Matsunaga, both of Kodaira, all of Japan

[73] Assignee: Bridgestone Corporation, Tokyo, Japan

[21] Appl. No.: 565,837

[22] Filed: Aug. 13, 1990

[30] Foreign Application Priority Data

| Aug. 24, 1989 | [JP] | Japan | 1-217977 |
| Nov. 13, 1989 | [JP] | Japan | 1-292400 |
| Dec. 28, 1989 | [JP] | Japan | 1-338667 |
| Feb. 16, 1990 | [JP] | Japan | 2-33972 |

[51] Int. Cl.$^5$ .................... B60C 11/00; B60C 9/18
[52] U.S. Cl. .................. 152/209 R; 152/526; 152/527; 152/533; 152/538
[58] Field of Search ............ 152/209 R, 209 D, 526, 152/527, 531, 533, 535, 536, 538

[56] References Cited

U.S. PATENT DOCUMENTS

| 2,930,425 | 3/1960 | Lugli et al. | 152/531 |
| 3,018,810 | 1/1962 | Barassi | 152/526 |
| 3,133,583 | 5/1964 | Dobson | 152/533 |
| 3,503,432 | 3/1970 | Maiocchi | 152/536 |
| 3,782,438 | 1/1974 | Murtain | 152/209 R |
| 4,231,409 | 11/1980 | Mezzanotte | 152/527 |
| 4,869,307 | 9/1989 | Bormann et al. | |
| 4,989,658 | 2/1991 | Maathuis et al. | 152/538 |

FOREIGN PATENT DOCUMENTS

| 0101400 | 2/1984 | European Pat. Off. | |
| 0313362 | 4/1989 | European Pat. Off. | |
| 0442678 | 8/1991 | European Pat. Off. | 152/527 |
| 3432792 | 4/1985 | Fed. Rep. of Germany | |
| 1196438 | 11/1959 | France | |
| 2405148 | 5/1979 | France | |
| 2-128904 | 5/1990 | Japan | 152/533 |

Primary Examiner—Michael W. Ball
Assistant Examiner—Nancy T. Krawczyk
Attorney, Agent, or Firm—Sughrue, Mion, Zinn, Macpeak & Seas

[57] ABSTRACT

A high performance pneumatic radial tire comprises a toroidal carcass, a tread radially outside a crown portion of the carcass, a belt layer interposed between the carcass and the tread and having a same width of the tread, and an auxiliary layer arranged between the belt layer and the tread and covering the entire belt layer. organic cords are buried substantially parallel to an equatorial plane of the tire in the auxiliary layer, and land portions are defined between at least two circumferential main grooves formed in an outer surface portion of the tread and between the circumferential main grooves and axially opposite edges of the tread. In the tire, a rigidity of the tire corresponding to locations overlapping the circumferential main grooves is made smaller than that of portions corresponding to the land portions by, for example, constituting the auxiliary layer from at least two auxiliary plies comprising one auxiliary ply located on a radially innermost side and covering the belt layer over an entire width thereof, and cutting at least a radially outermost auxiliary ply at locations overlapping the circumferential main grooves among the auxiliary plies having portions overlapping the circumferential main groove.

23 Claims, 8 Drawing Sheets

FIG_5

HIGH PERFORMANCE PNEUMATIC RADIAL TIRES

BACKGROUND OF THE INVENTION (1) Field of the Invention

The present invention relates to high performance pneumatic radial tires which enable super high speed running.

(2) Related Art Statement

For high performance pneumatic radial tires, for example, tires have conventionally been known, which each comprise a carcass layer, a non-expandable belt layer arranged radially outside the carcass layer, a single auxiliary layer which is arranged all over the entirety of the radially outer side of the belt layer and in which organic fiber cords are buried substantially parallel to the equatorial plane of the tire, and a tread arranged radially outside the auxiliary layer. At least two circumferential main grooves are formed in the outer surface portion of the tread so that land portions are defined between the adjacent circumferential main grooves and between the axially outermost circumferential main grooves and edges of the tread.

However, although such tires can achieve running at relatively high speeds, they have a so-called chunk-out problem that when they are run at super high speeds recently required, for example, 200 to 300 km/hr, a land portion having a great mass largely swells radially outwardly due to centrifugal forces to cause blow-out. Consequently the land portion is peeled off thereby.

In order to solve the above problem, a technique has been proposed, in which the swelling-out of the land portion due to the centrifugal forces is effectively prevented by constituting the auxiliary layer using two or more auxiliary plies. For example, a single auxiliary ply covering the entire width of a belt layer, and a pair of another auxiliary plies which are arranged radially outside the first auxiliary ply and which cover the entire width of the belt layer or cover axially opposite end regions of the belt layer can be used.

However, in the case of the tire of this type, since the auxiliary layer is constituted by totally two or more auxiliary plies, the thickness of the auxiliary layer itself becomes greater. Consequently, a distance between a projection of a vulcanizing mold for the formation of the main circumferential groove and the axially outermost auxiliary ply becomes smaller at the time of termination of vulcanization. Due to this, the auxiliary layer and the belt layer is pushed and depressed radially inwardly, at locations which overlap the circumferential main grooves, by the projections of the vulcanizing mold, so that the auxiliary layer and the belt layer are entirely waved. When internal pressure is applied to the tire having the auxiliary layer and the belt layer thus waved, the auxiliary layer and the belt layer are deformed to axially expand and flatten. Such a deformation influences the shape of the surrounding land portion. That is, there is a tendency that while the central part of the land portion is depressed, the axially opposed side parts of the land portion project radially outside. As a result, since the ground contact pressure of the land portion becomes non-uniform, the tire is unevenly worn. In addition, when the entire thickness of the auxiliary layer is great as mentioned above and when the circumferential main grooves are formed in the tread rubber during vulcanizing, the distance between the bottom of the circumferential main groove and the auxiliary layer, that is, a base gauge, becomes smaller. Accordingly, it is feared that if a crack or a cut is formed on the bottom of the circumferential main groove, water or the like reaches the auxiliary layer or the belt layer, and that the auxiliary layer or the belt layer is broken.

On the other hand, in order to assure the sufficient thickness of the tread at the location corresponding to the groove, the thickness of the entire tread rubber must be made great. In that case, since the weight of the entire tread increases, this technique is disadvantageous for the high speed durability of the tire.

SUMMARY OF THE INVENTION

It is an object of the present invention to provide high performance pneumatic radial tires which enable super high speed running, and can control uneven wearing at land portions while assuring a necessary degree of a base gauge.

According to a first aspect of the present invention, the high performance pneumatic radial tire comprises a toroidal carcass, a tread radially outside a crown portion of the carcass, a belt layer interposed between the carcass and the tread and having a same width of the tread, and an auxiliary layer arranged between the belt layer and the tread and covering the entire belt layer, organic cords of the auxiliary layer being buried substantially parallel to an equatorial plane of the tire, and land portions being defined between at least two circumferential main grooves formed in an outer surface portion of the tread and between the circumferential main grooves and axially opposite edges of the tread, wherein circumferential rigidity of portions of the auxiliary layer corresponding to the circumferential main grooves is smaller than that of portions corresponding to the land portions.

According to a second aspect of the present invention, the high performance pneumatic radial tire comprises a toroidal carcass, a tread radially outside a crown portion of the carcass, a belt layer interposed between the carcass and the tread and having the same width of the tread, and an auxiliary layer arranged between the belt layer and the tread and covering the entire belt layer, organic cords being buried substantially parallel to an equatorial plane of the tire, and land portions being defined between at least two circumferential main grooves formed in an outer surface portion of the tread and between the circumferential main grooves and axially opposite edges of the tread, wherein the auxiliary layer is constituted by at least two auxiliary plies comprising a ply which covers the belt layer over an entire width thereof, and another auxiliary ply having portions overlapping the circumferential main groove, and the another auxiliary ply is discontinued at locations overlapping the circumferential main grooves.

The following countermeasures are preferable for the present invention.

(1) The belt layer consists of at least two belt plies containing cords made of non-expandable metal or organic fibers arranged at a shallow angle with respect to the equatorial plane of the tire while the cords in one of at least two belt plies are crossed to those in adjacent one, and the auxiliary plies contain cords made of thermally shrinkable cords arranged substantially parallel to the equatorial plane of the tire.

In this pneumatic radial tire, it is preferable that a number of the cords per unit width in the auxiliary belt layer as viewed in a section orthogonal to the equatorial plane of the tire is increased in the order of regions corresponding to the circumferential main grooves of the tread, regions corresponding to the land portions between the adjacent circumferential main grooves, and a region corresponding to the land portions adjoining the edges of the tread.

(a) Further, it is preferable that a base rubber is arranged radially inside the tread and radially on an outer side of the belt layer, and the base rubber has a 100% elongation modulus and a resilience both being higher than those of a rubber of the tread.

(b) The base rubber is preferably provided in a thickness of 1-2 mm radially on the auxiliary layer excluding shoulder portions of the tread over 65-80% of the width of the tread, centering around the equator of the tire.

(c) More preferably, the base rubber layer has the 100% elongation modulus of 20-40, more desirably 10-30, and the resilience of not less than 20%, more desirably 10%-30%.

(2) A plurality of rows of blocks are defined by providing a number of lateral grooves passing through the circumferential main grooves and extending substantially in parallel to one another, the belt layer consists of at least two belt plies containing non-expandable cords arranged at a shallow angle with respect to the equatorial plane of the tire while the cords of one of the belt plies ar crossed to those of adjacent one, the auxiliary layer contains thermally shrinkable cords arranged substantially parallel to the equatorial plane of the tire, and an initial modulus per unit width of the auxiliary layer is greater at portions substantially corresponding to the vertical rows of the blocks than that substantially corresponding to the circumferential grooves.

(a) Preferably, the number of the auxiliary plies is greater at the portions corresponding to the land portions than that at the portions corresponding to the circumferentially main grooves.

(b) More preferably, cords arranged in the auxiliary layer at the portions corresponding to the land portions have the modulus greater than that of cords arranged at the portions corresponding to the land portions.

(c) The auxiliary layer is preferably formed by spirally winding a thermally shrinkable cord around an outer periphery of the belt layer in a direction substantially parallel to the equator of the tire, and the spiral winding is effected under application of higher tension for the portions corresponding to the land portions than for the portions corresponding to the circumferential main grooves.

(d) The auxiliary layer is preferably formed by spirally winding thermally shrinkable cords around an outer periphery of the belt layer in a direction substantially parallel to the equator of the tire, and a distance between adjacent cords is greater at the portions corresponding to the circumferential main grooves than that at the portions corresponding to the land portions.

(e) The auxiliary layer is preferably formed by spirally winding a thermally shrinkable cords around an outer periphery of the belt layer in a direction substantially parallel to the equator of the tire such that the cord is spirally wound in an overlapped fashion at the portions corresponding to the land portions.

(f) The auxiliary layer may be formed by spirally winding a rubberized cord member containing a plurality of thermally shrinkable cords around the outer periphery of the belt layer in a direction substantially parallel to the equator of the tire.

These and other objects, features and advantages of the invention will be apparent upon reading of the following description of the invention when taken in conjunction with the attached drawings, with the understanding that some modifications, variations and changes of the same could be made by the skilled person in the art to which the invention pertains without departing from the spirit of the invention or the scope of claims appended hereto.

BRIEF DESCRIPTION OF THE ATTACHED DRAWINGS

For a better understanding of the invention, reference is made to the attached drawings, wherein.

DETAILED DESCRIPTION OF THE INVENTION

The first embodiment of the present invention will now be explained with reference to FIG. 1.

Figure 1:
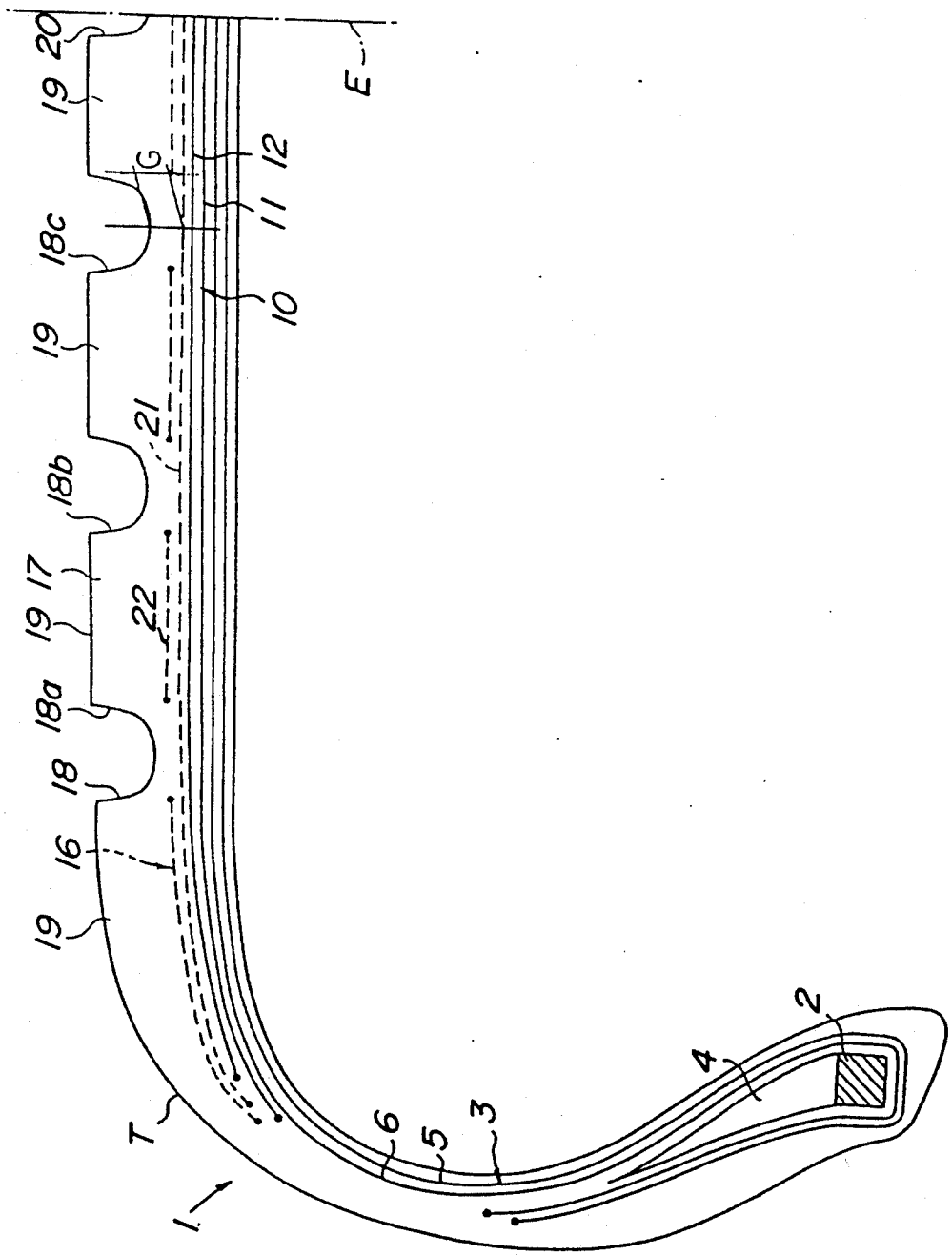
FIG. 1 is a sectional view of a first embodiment of the tire according to the present invention along a median plane.

In FIG. 1, a reference numeral 1 is a high performance pneumatic radial tire capable of running at 200-300 km/hr. This tire 1 is a tire having a super low aspect ratio ranging from 0.6 to 0.3 which is a ratio of a height of the tire to a maximum width of the tire as viewed sectionally. In this embodiment, the tire 1 has a tire size of 255/40 ZR 17 (aspect ratio: 0.4). The tire 1 is reinforced by a carcass 3 extending toroidally from one of bead rings 2 to the other. Each of the opposed edge portions of the carcass 3 is turned up from the axially inner side to the axially outer side around the bead ring 2 and a bead filler 4 composed of a hard rubber. The carcass 3 is constituted by at least one ply. In this embodiment, the carcass layer is constituted by a laminate of two carcass plies 5 and 6. Fiber cords are buried in each of the carcass plies 5 and 6 such that the cords extend in almost radial directions and are crossed with an equatorial plane E of the tire at almost 90°. In this embodiment, a number of rayon cords of 1650 d/2 are buried.

A belt layer 10 is arranged radially outside the carcass 3. The belt layer 10 is constituted by at least two belt plies 11 and 12 into which non-expandable cords represented by steel cords or the like are buried. In this embodiment, the number of the belt plies is two. The cords buried in the belt plies 11 and 12 are inclined with respect to the tire equatorial plane E at an angle of 15-35°, and the cords in one of the belt plies are crossed with those in the other belt ply, while the former and the latter are inclined in reverse directions, respectively. In this embodiment, a number of steel cords having a cord construction of 1×5 are buried in the belt plies 11 and 12 while being crossed at an angle of 25° with respect to the equatorial plane E of the tire.

Reference numeral 16 is an auxiliary layer arranged radially outside the belt layer 10. A tread 17 is arranged radially outside the auxiliary layer 16 and the belt layer 10 mentioned above. At least two wide circumferential main grooves 18 are formed in the outer surface portion of the tread 17. In this embodiment, three straight grooves are formed on each of opposed sides along the tire equatorial plane E as a symmetrical plane. These circumferential main grooves 18 are spaced from each other in the axial direction at an almost equal distance. As a result, circumferentially extending land portions 19 are defined between the adjacent circumferential main grooves 18 and between the axially outermost circumferential main grooves 18 and side edges T of the tread. In this embodiment, although not shown, each of the land portions 19 is divided into blocks by a plurality of lateral grooves which are circumferentially spaced from one another while being inclined and crossing the circumferential direction. In this embodiment, a circumferential auxiliary groove 20 having a width slightly narrower than that of the circumferential main groove 18 is formed in the equatorial plane E of the tire. The width and the depth of the circumferential main groove 18 are 10 mm and 8 mm, respectively. On the other hand, the width and the depth of the circumferentially auxiliary grooves 20 are 5 mm and 6 mm, respectively.

The above auxiliary layer 16 is constituted by two or more auxiliary plies (two plies 21 and 22 in this embodiment) into which thermally shrinkable organic fiber cords represented by nylon cords (cords made of 66-nylon having 1260 d/2 in this embodiment) are buried. The cords in these auxiliary plies 21 and 22 are arranged substantially parallel to the equatorial plane E. The auxiliary layer 16 has a single auxiliary ply 21 covering the belt layer 10 over its entire width on the innermost side of the auxiliary layer 16. Similarly with this auxiliary ply 21, the auxiliary ply 22 is arranged radially outside the auxiliary ply 21 to intermittently cover the entire width of the belt layer 10 while overlapping the land portions 19 of the tread. As a result, even when great centrifugal forces are applied to the land portions 19 due to rotation of the tire 1 at high speeds, the radially outward swelling of each of the land portions 19 is strongly restricted by these auxiliary plies 21 and 22. Consequently, the occurrence of chunk-out can assuredly be prevented. In this embodiment, among the auxiliary plies, the outermost auxiliary ply, i.e., the auxiliary ply 22 in this embodiment, is cut at locations overlapping the circumferential main grooves 18a, 18b and 18c. Areas where the auxiliary ply 22 is cut do not remain void, but they are filled with the rubber of the tread 17. When the auxiliary ply 22 is cut like this, projections (projections for the formation of the circumferential main grooves 18) in the vulcanizing mold are opposed to the auxiliary ply 21 located radially inside the auxiliary ply 22. As a result, a necessary rubber thickness between the groove-forming projection of the vulcanizing mold and the auxiliary ply 21 is obtained at the time of the termination of the vulcanizing. Therefore, the influence which the projections of the vulcanizing mold afford upon the auxiliary layer 16 and the belt layer 10 at the time of the vulcanizing is small, and a radially inwardly depressed amount of each of the auxiliary layers and the belt layer is reduced. Consequently, the tire 1 has almost uniform ground contact pressure at the ground contact portions 19 even when the tire is run, and uneven wearing can be suppressed. In addition, 1.5 mm can be assured as the necessary thickness G between the bottom of the circumferential main groove 18 and the auxiliary ply 21, i.e., for the skid base gauge G in this embodiment. In this embodiment, each of the above auxiliary plies 21 and 22 is formed by arranging a plurality of cords (two to fifteen cords) in parallel, rubberizing these cords to obtain a ribbon-like member having a width of 5-10 mm (equivalent to 10-30% of the width of the land portion 19), and spirally winding the ribbon-like member under application of a given tension. As to the auxiliary ply 22, the ply may independently or continuously be wound onto the ply 21 without cutting the ribbon-like member with respect to each of locations corresponding to the land portions. For example, when the auxiliary ply is to be formed by spirally winding the ribbon-like member starting from one end of the belt layer, continuous ribbon-like members may intermittently be arranged without cutting the ribbon-like member for each of the locations corresponding to the land portions. Alternatively, it may be that the ply 21 arranged nearer to the belt layer is an axially discontinuous ply at the location corresponding to the main groove as the ply 22, while the ply 22 positioned nearer to the tread is designed as a continuous ply as the ply 21. In this case, the tire having substantially totally an equivalent configuration as that of the tire shown in FIG. 1 can be obtained. These auxiliary plies are formed by spirally winding the above ribbon-like members under application of the given tension.

Figure 2:
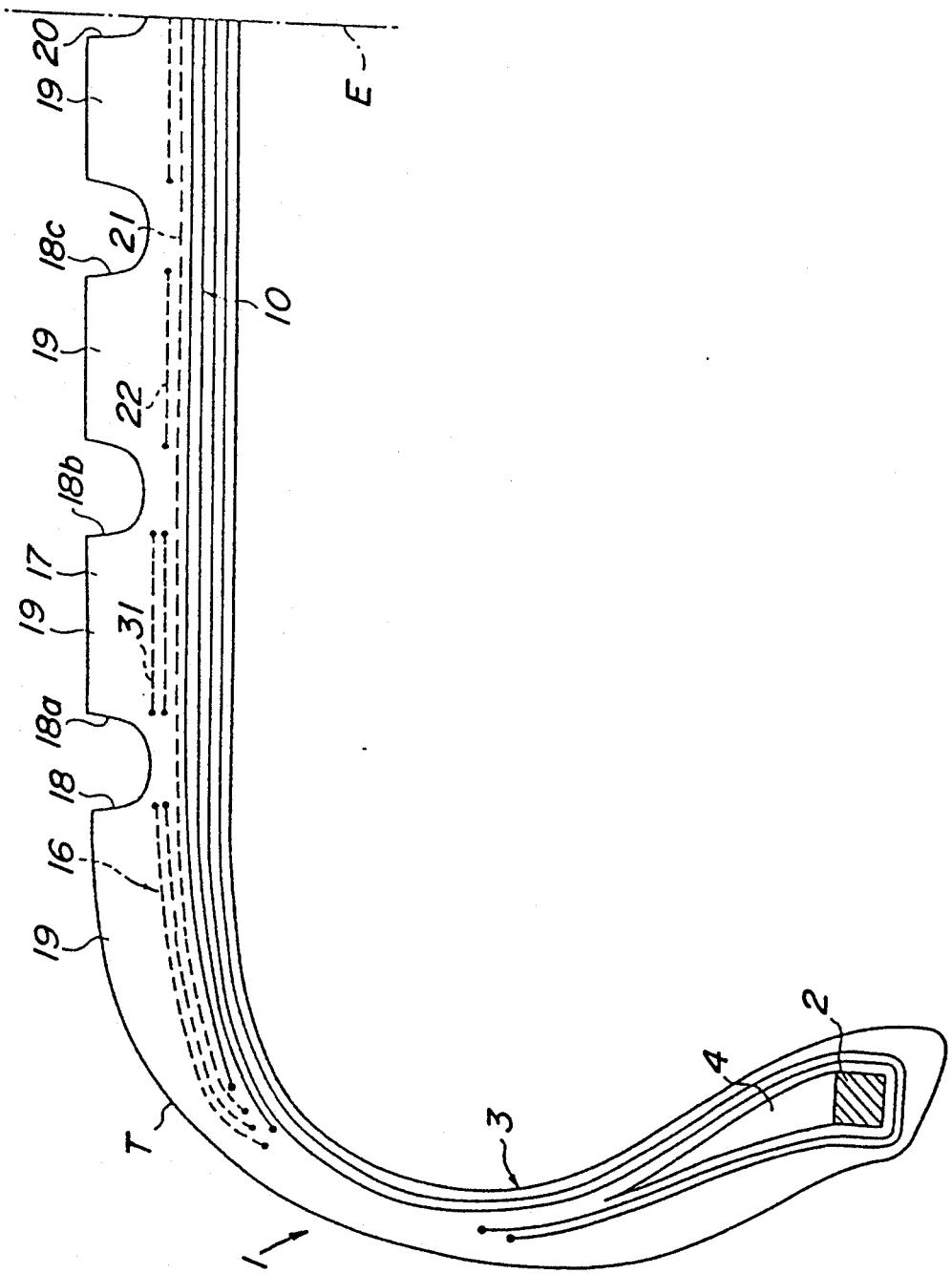
FIG. 2 is a sectional view of a second embodiment of the tire according to the present invention along a median line.

FIG. 2 is a sectional view illustrating the second embodiment of the present invention. This embodiment is characterized in that a third auxiliary ply 31 is arranged radially outside the auxiliary ply 22. This auxiliary ply 31 covers axially end portions of the belt 10 from the tread edges T to the circumferential main grooves 18b. In this embodiment, the outermost auxiliary ply 31 is cut at a location where the auxiliary ply 31 overlaps the circumferential main grooves 18a. On the other hand, the auxiliary ply 22 positioned radially inside the auxiliary ply 31 is cut at the locations where the auxiliary ply overlaps groove-forming the circumferential main grooves 18a, 18b and 18c.

Figure 3:
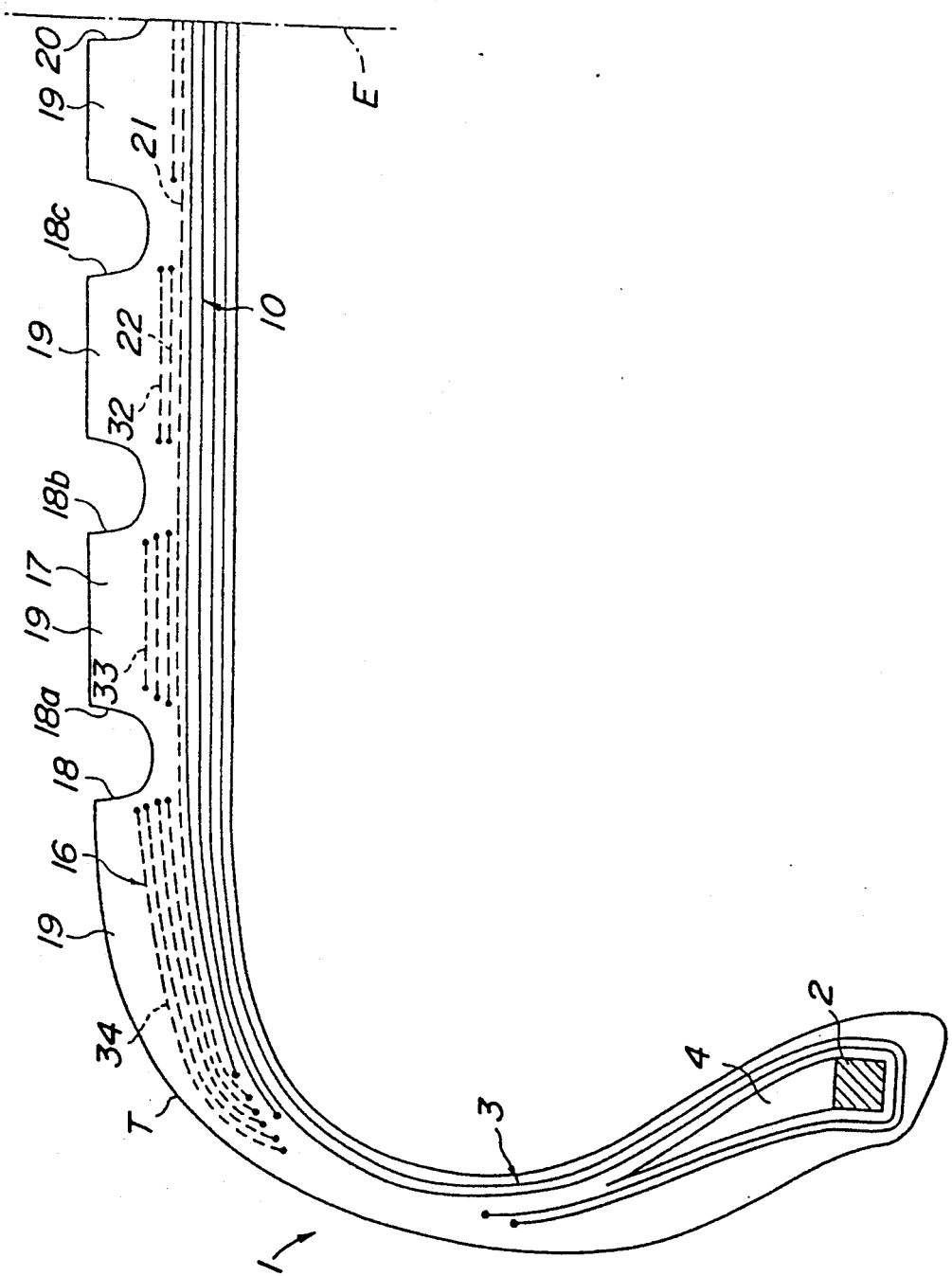
FIG. 3 is a sectional view of a third embodiment of the tire according to the present invention along a median line.

FIG. 3 is a sectional view illustrating a third embodiment of the present invention. This embodiment is characterized in that additionally three auxiliary plies 32, 33 and 34 are successively plied on the radially outer side of the two auxiliary plies 21 and 22 to continuously or intermittently cover the above belt layer 10 over its entire width, respectively, from the outer side to the inner side in the radial direction. The auxiliary ply 32 covers the belt layer 10 from the tread edge T to the circumferential main groove 18c. The auxiliary ply 33 covers the belt layer 10 from the tread edge T to the circumferential main groove 18b. The auxiliary ply 34 covers the belt layer 10 from the tread edge T to the circumferential main groove 18a. In this embodiment, among the auxiliary plies 21, 22, 32 and 33 involving portions overlapping the circumferential main grooves 18, not only the outermost auxiliary ply 33 but also the inner auxiliary plies 32 and 22 are cut at the locations where the plies overlap the circumferential main grooves. Since the auxiliary ply 34 does not overlap the circumferential main grooves 18 at any location, no cut portion is present therein.

Figure 4:
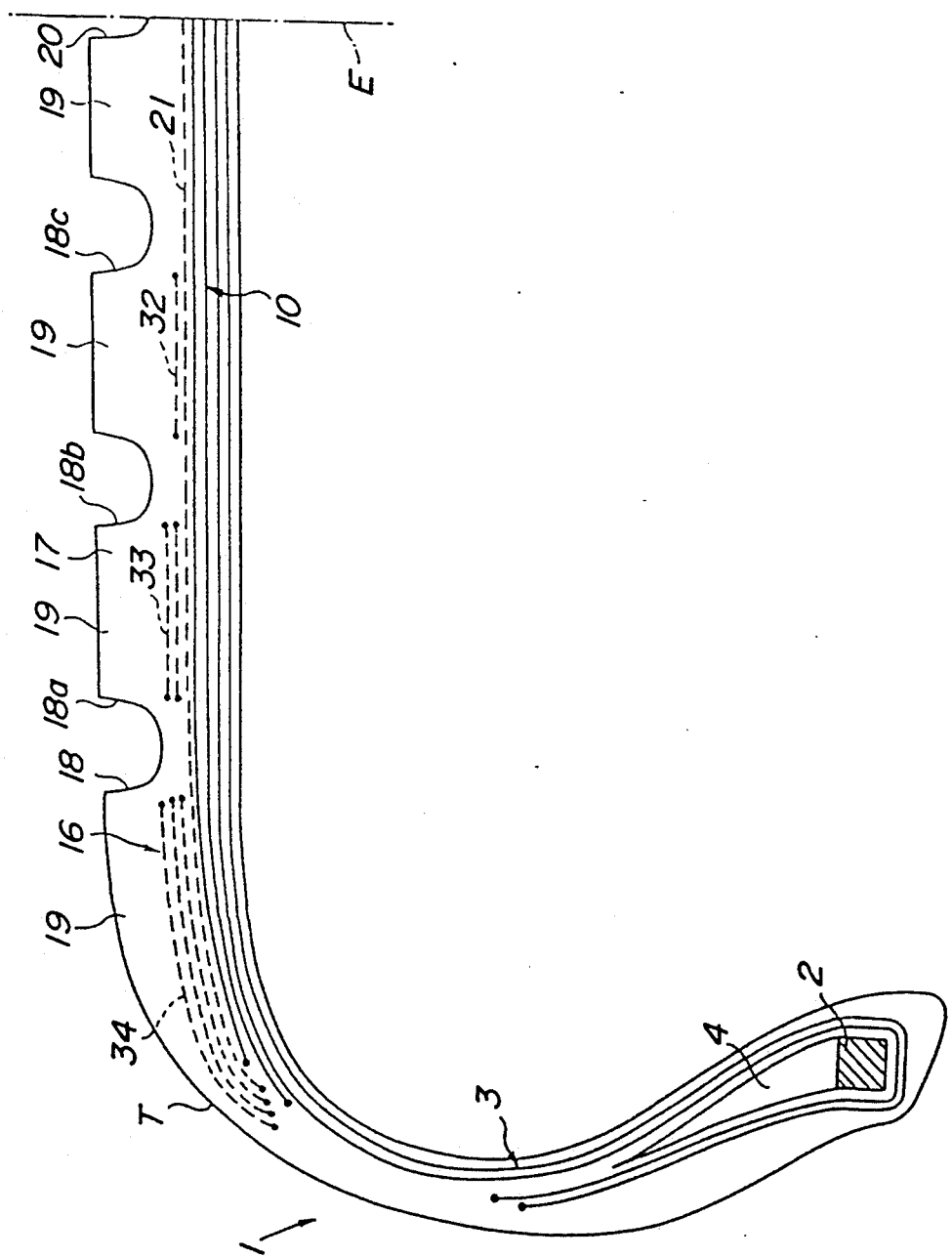
FIG. 4 is a sectional view of a fourth embodiment of the tire according to the present invention along a median line.

FIG. 4 is a sectional view of illustrating a fourth embodiment of the present invention. This embodiment is characterized in that the auxiliary ply 22 intermittently overlapping the entire width of the belt layer 10 as explained in connection with the first embodiment is omitted, and three auxiliary plies 32, 33 and 34 as explained in connection with the third embodiment are provided. The auxiliary plies 32 and 33 excluding the auxiliary ply 34 are cut at locations overlapping the main circumferential grooves 18. It is preferable to form a laminate of plies radially piled as in the case of the auxiliary plies 21, 22, 32, 33 and 34 by spirally and continuously winding the ribbon-like member, if producing conditions permit (In this case, the number of cut ends of the ribbon-like member can be reduced).

Figure 5:
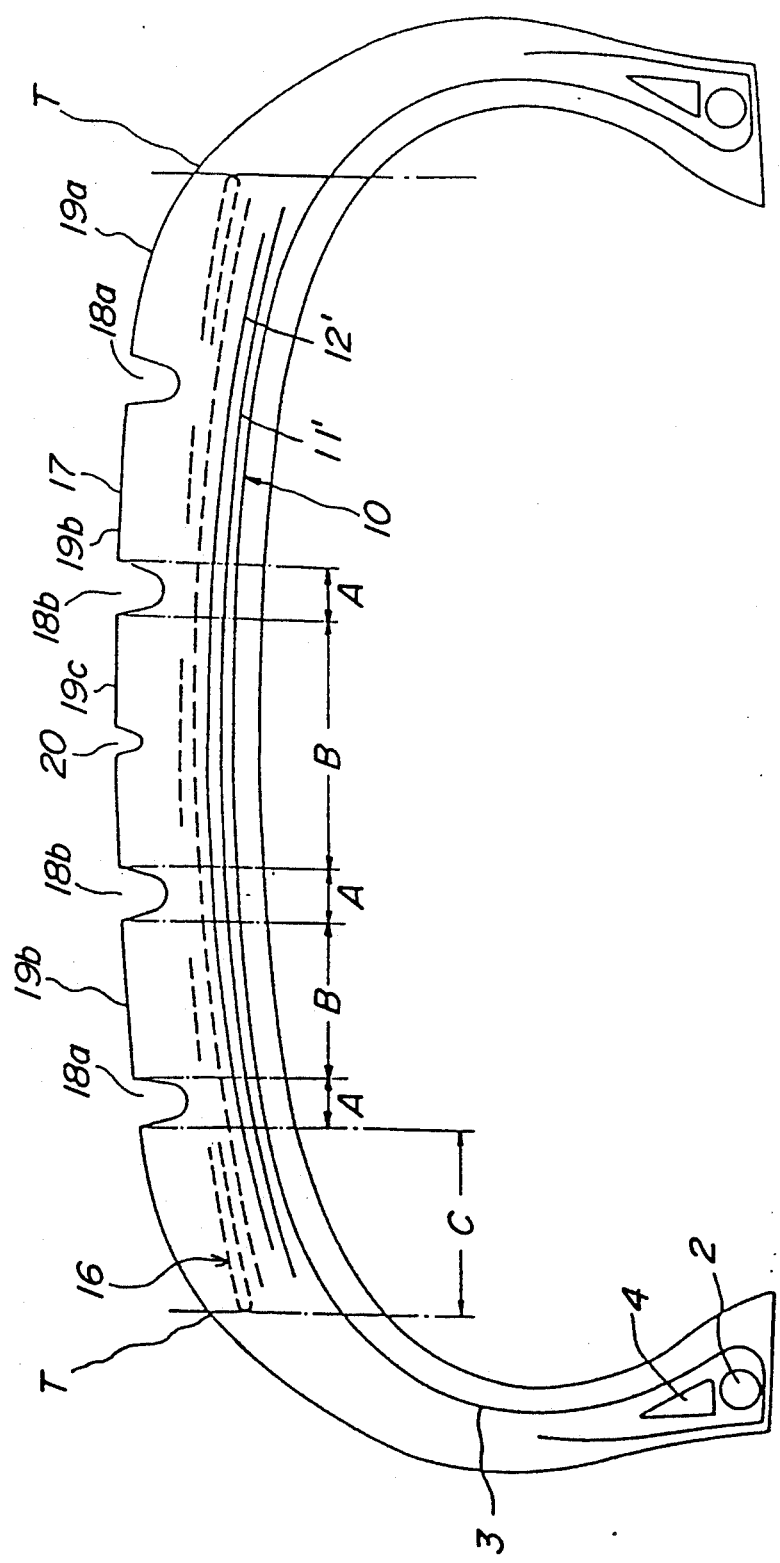
FIG. 5 is a sectional view of a fifth embodiment of the tire according to the present invention along a median line.

FIG. 5 is a sectional view illustrating a fifth embodiment of the present invention. This embodiment is characterized in that at least two belt plies in which non-expandable organic fiber cords represented by aromatic amide fiber cords are arranged at 10°-40°, preferably at 15°-35° with respect to the equatorial plane of the tire while the cords are crossed between the adjacent belt layers are employed as the main belt plies 11' and 12', and an auxiliary layer 16 is provided by spirally winding one or more rubberized thermally shrinkable cords (for example, nylon cords) over the entire width of the thus constituted belt layer substantially in parallel with the equatorial plane of the tire. A tread 17 is positioned on the belt layer 10 constituted in this manner.

The auxiliary belt layer 16 is constituted such that the number of the cords per unit width in a section orthogonal to the equatorial plane of the tire is increased in the order of regions A substantially corresponding to the circumferential grooves 18a and 18b of the tread 17, regions B substantially corresponding to land portions 19c, 19b between the circumferential grooves 18b, 18b of the tread 17 and between the circumferential grooves 18a and 18b in the tread, and a region C corresponding to the land portion 19a between the edge of the tread T and the circumferential main grooves 18a.

Figure 6:
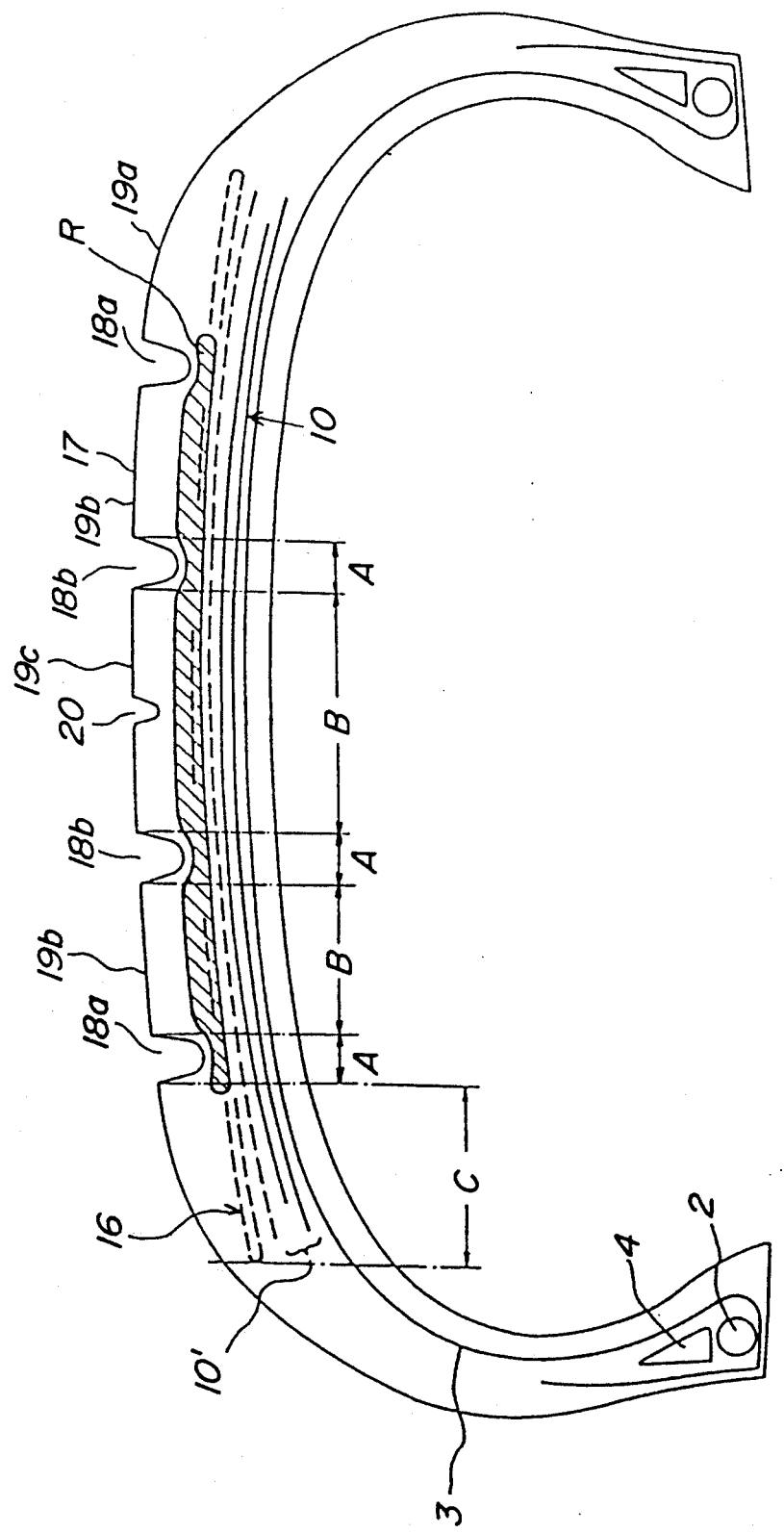
FIG. 6 is a sectional view of a sixth embodiment of the tire according to the present invention along a median line.

FIG. 6 is a sectional view of a sixth embodiment of the present invention. This embodiment is characterized in that in order to enhance the durability of the tread, a base rubber layer R having a high 100% elongation modulus and high resilience is arranged radially inside the tread rubber layer. The difference between this embodiment and that shown in FIG. 5 lies in the structure of the tread rubber layer only.

The embodiment shown in FIG. 6 is advantageously suitable for a tire using non-expandable textile cords not steel cords in the main belt plies 11' and 12'. That is, when the main belt ply is made of the textile cords, the movement of the tire during rotation under application of a load tends to become relatively large at the shoulder portions on the opposite sides of the tread. Therefore, if the base rubber layer is positioned up to these regions, the so-called chunk-out phenomenon where the rubber is cut at the boundary of the base rubber layer and further inside the base rubber layer is likely to disadvantageously occur. In view of this, it is preferable that the base rubber layer having such high 100% elongation modulus and high resilience to control heat generation is arranged in the central region of the tread and that an ordinary rubber having relatively lower 100% elongation modulus and relatively lower resilience than those of the base rubber layer is applied to the other portion directly contacting the road (This ordinary rubber is the same material as the tread rubber layer in FIG. 5, and is referred to hereinafter as the cap rubber layer).

More particularly, it is preferable to provide the base rubber layer R on the auxiliary belt layer 16 in a thickness of 1-2 mm over a width of 65-80% of the width of the tread as centering around the tire equator excluding portions corresponding to the shoulder portions of the tread (the portions C in FIG. 6).

As the base rubber layer, rubber having a 100% modulus of 20-40 kg/cm$^2$ and a resilience of not less than 20% may be used. As the cap rubber layer, a rubber having a 100% modulus of 10-30 kg/cm$^2$ and a resilience of 10%-30% may be used.

Figure 7:
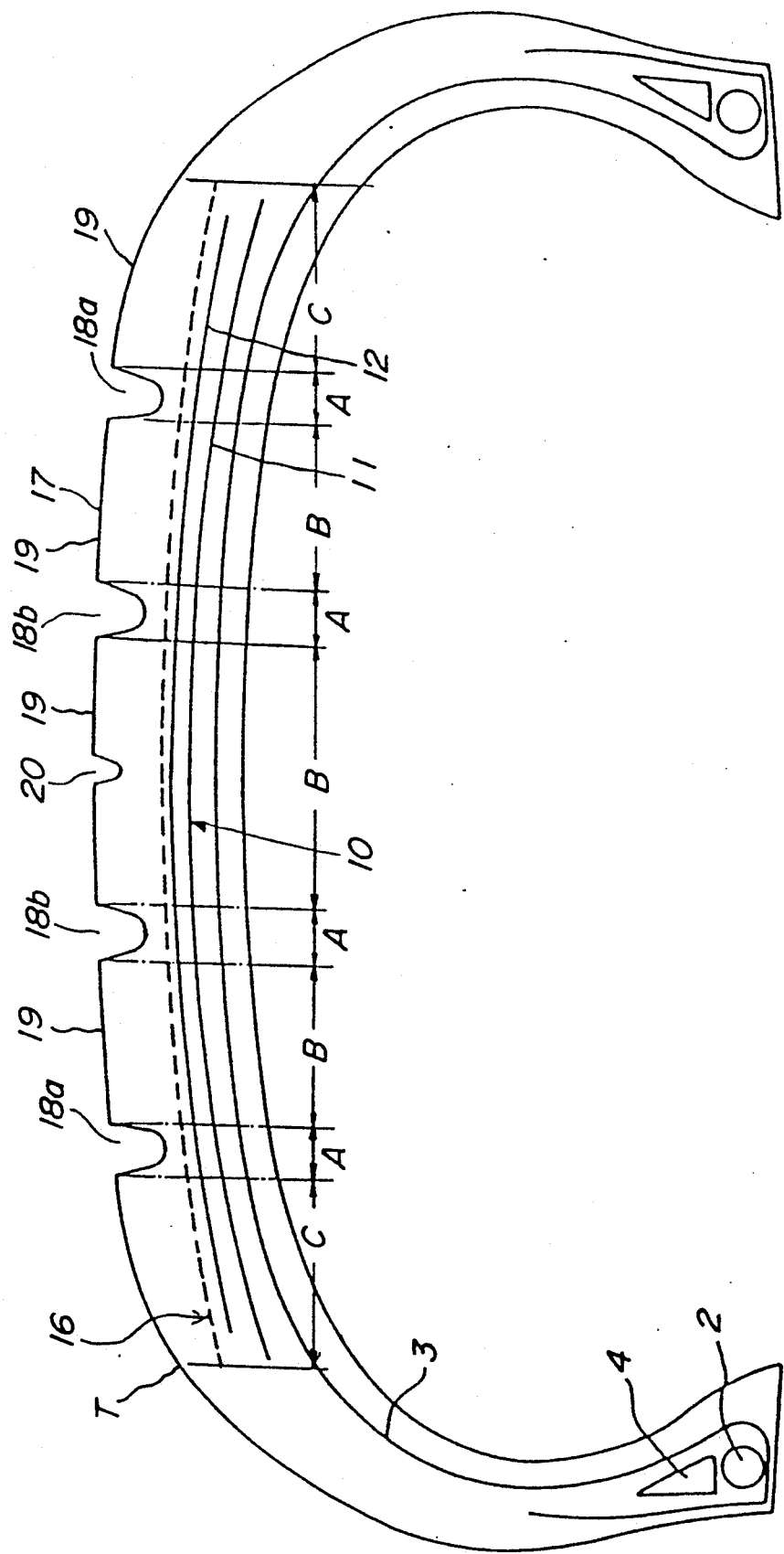
FIG. 7 is a sectional view of a seventh embodiment of the tire according to the present invention along a median line.

FIG. 7 is a sectional view illustrating a seventh embodiment of the present invention. In FIG. 7, a belt layer 10 consists of main belt plies 11 and 12 and an auxiliary belt layer 16 extended over the entire width of the main belt plies 11 and 12. In the main belt plies 11 and 12, non-expandable cords such as steel cords or aromatic polyamide fiber cords are arrayed at an angle of 15°-35° with respect to the equatorial plane of the tire, while the cords in one of the plies are crossed with those in the other. The auxiliary belt layer 16 is constituted by spirally winding one or more rubberized thermally shrinkable cords (for example, nylon cords) substantially in parallel to the equatorial plane of the tire. A tread 17 is arranged o the belt layer 10.

The auxiliary belt layer 16 is constituted such that the initial modulus per unit width is greater in regions B corresponding to land portions 19 defined by circumferential grooves 18 and regions C corresponding to land portions 19 sandwiched between edges of the tread and the axially outermost circumferential grooves 18a is made greater as compared with that of regions A corresponding to the circumferential grooves 18a and 18b of the tread. It is preferable that the initial modulus in regions B and C is greater than the initial modulus of the region A by around 20%. It is preferable that a region which extends along the circumferential groove in a width of 50-150% of a width w of an opening of the circumferential groove (hereinafter referred to as the groove width) around a center of a ½ point of the groove width is taken as the region A corresponding to the circumferential groove 18a, 18b, and the remainder is taken as the zones B and C.

The initial modulus per unit width of the auxiliary layer is defined by:

$$M = \frac{F \times 10}{S} \times n$$

in which F, S and n are a load (kgf) of the cord constituting the auxiliary belt layer taken out from the tire at an elongation of 10%, a sectional area (cm$^2$) of the cord, and the number of the cords per unit width, respectively. The average value of the initial moduli in each of the zones A, B and C calculated by the above equation is taken as the initial modulus of each of the zones A, B and C, respectively.

Since extremely strong centrifugal forces act upon the tire running at super high speeds as compared with running at medium or low speeds, the tread tends to project radially outwardly. Since the projecting amount of the tread is greater at the blocks and smaller at the circumferential grooves, the ground contact pressure is non-uniform.

In this embodiment, the projecting amount of the tread is made as small as possible by varying the initial modulus per unit width of the auxiliary layer arranged radially inside the tread depending upon the differences in the projecting amounts in the case that no adjustment is effected.

That is, the initial modulus per unit width of the auxiliary layer is made greater at the regions B and C corresponding to the vertical row of blocks as compared with that of the region A corresponding to the circumferential groove of the tread. Thus, the projection is suppressed by affording higher modulus to the vertical rows of the blocks which would more greatly project due to the centrifugal forces. To the contrary, the modulus of the region corresponding to the circumferential groove which would have a smaller projection amount is decreased. By so constructing the tire, differences in the projection amount between the vertical block row and the circumferential groove is suppressed to make the projection amount uniform.

In order to make the initial modulus per unit width of the auxiliary belt layer different between the region A and the regions B and C, the following countermeasures are advantageously suitable.

(1) The number of the plies in the regions B and C is made greater than that in the region A.

(2) The cords having a modulus greater than that of the cords in the region A are arranged in the regions B and C. For example, nylon cords and polyester cords are arranged in the region A and in the regions B and C, respectively.

(3) When the tire is produced by spirally winding the thermally shrinkable cords around the outer periphery of the main belt layer substantially in parallel to the equator of the tire, the spiral winding is effected under application of higher tension for the regions B and C as compared with the region A.

(4) When the tire is produced by spirally winding the thermally shrinkable cords around the outer periphery of the main belt layer substantially in parallel to the equator of the tire, the distance between the cords is made smaller for the regions B and C as compared with the region A.

(5) When the tire is produced by spirally winding the thermally shrinkable cords in the similar manner, the cords are wound in an overlapped fashion for the regions B and C.

Figure 8:
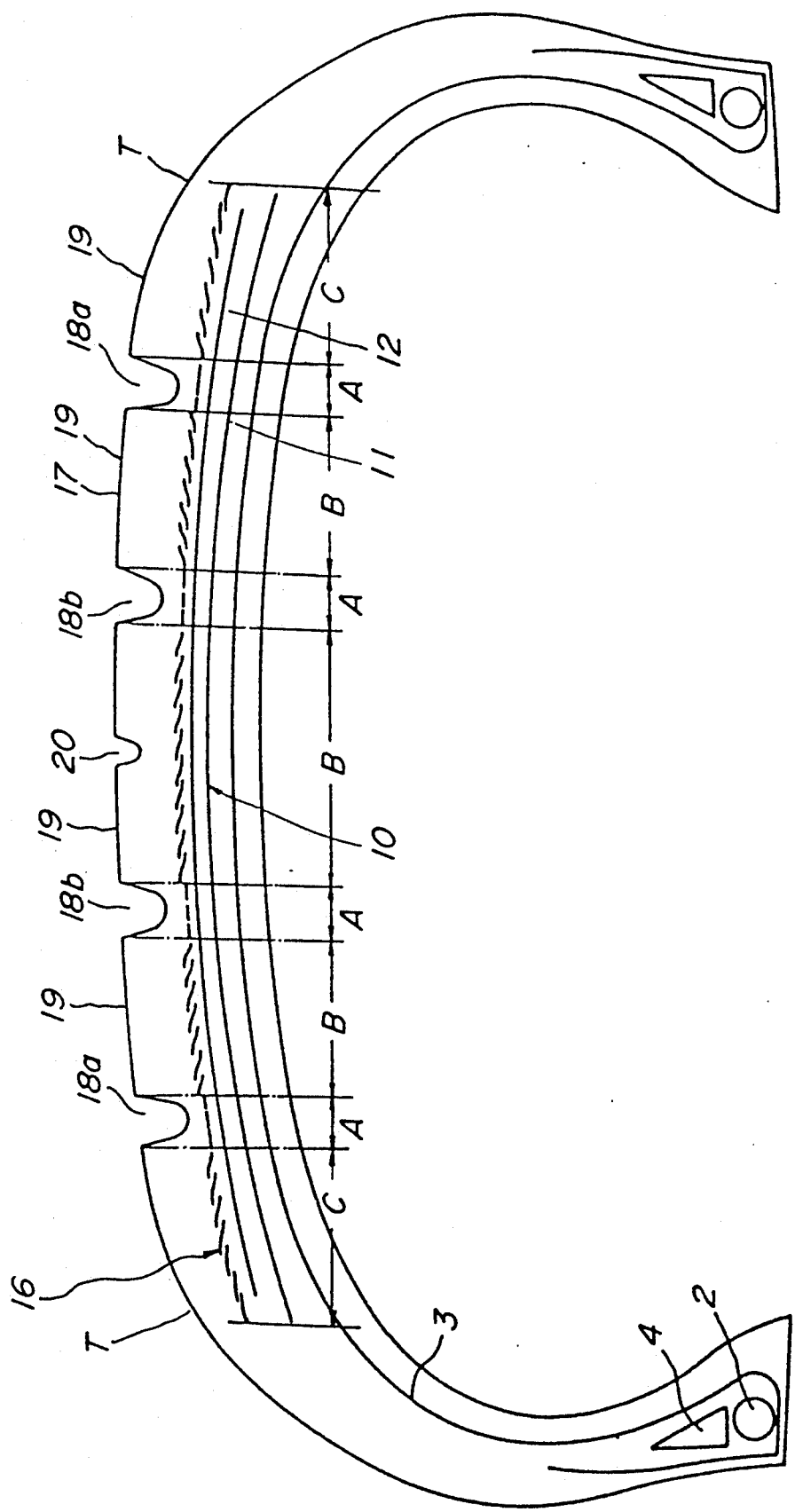
FIG. 8 is a sectional view of an eight embodiment of the tire according to the present invention along a median line.

FIG. 8 shows an eighth embodiment of the present invention. This embodiment is characterized in that the tire is constituted by an auxiliary layer formed by the above countermeasure (5), as shown in FIG. 8, the auxiliary belt layer 16 is wound in an overlapped manner excluding the regions A, and the initial modulus of the regions A is made different from those of the regions B and C by adjusting the overlapped degree of the cords.

More particularly, when the auxiliary belt layer 16 is to be formed, the above-mentioned ribbon-like member is spirally wound for the regions B and C in the overlapped manner in a necessary width around the outer periphery of the main belt layer 12 as shown.

Next, test examples will be explained.

In the tests, test tires according to the first embodiment of the present invention shown in FIG. 1 and Comparative Test tires having the same construction as that of the test tire excluding that the outer auxiliary ply 22 was axially continued without being cut at the locations of the circumferential grooves were prepared. Then, each of the tires was inflated with an internal pressure of 2.5 kg/cm$^2$, and was run at an initial speed of 100 km/hr for 10 minutes only, while being pressed against a high speed drum under application of a load of 500 kg. Then, the speed was increased by 10 km/hr every 10 minutes until the tire was broken. Results showed that both Comparative Tire and Test tire were broken at the same speed, and that whether the auxiliary ply was cut or not does not afford any influence upon the high speed durability at all.

Thereafter, after each of the test tire and comparative tire was inflated with an internal pressure of 2.5 kg/cm$^2$, the tire was fitted to a passenger car. Then, the car was continuously run at a speed of 150 km/hr over a distance of 5,000 km around a course having a circuit distance of 6 km. After that, a difference in wear amount between an axially central portion and an axially outer edge portion of the block of each of the tires was measured. Results showed that the difference was 1.0 mm on the average in the Comparative Tire, while that was 0.3 mm on the average in the test tire. Thus, it is seen that the test tire had more excellent uneven wear resistance than the comparative tire.

In the above-mentioned embodiments, all the auxiliary plies 22, 31, 32 and 33 (excluding the innermost auxiliary ply 21) which each have the overlapped portions of the circumferential main grooves 18 are cut at the overlapped portions. However, it is sufficient in the present invention that at least the outermost auxiliary ply only may be cut among these auxiliary plies. Further, according to the present invention, it may be that all the auxiliary plies containing the innermost auxiliary ply 21 are cut in the portions overlapping the circumferential main grooves 18.

As having been explained above, according to the present invention, the tires can be run at super high speeds, while uneven wearing which would occur at the land portions can be controlled. In addition, a necessary thickness of the base gauge can be assured.

We claim:

1. A high performance pneumatic radial tire comprising; a toroidal carcass, a tread radially outside a crown portion of the carcass, and having at least two circumferential main grooves, a belt layer interposed between the carcass and the tread and having substantially a same width of the tread, an auxiliary layer arranged between the belt layer and radially inwardly of groove bottoms of said circumferential main grooves and extending across the belt layer, said auxiliary layer comprising thermal shrinkable organic cords buried substantially parallel to an equatorial plane of the tire, and land portions being defined between at least two of said circumferential main grooves formed in an outer surface portion of the tread and between the circumferential main grooves and axially opposite edges of the tread, wherein circumferential rigidity of those portions of the auxiliary layer corresponding to the circumferential main grooves is smaller than that of all portions of said auxiliary layer corresponding to land portions between said main grooves in an axially central portion of said tread and land portions in axially opposite edges of said tread.

2. A high performance pneumatic radial tire according to claim 1, wherein the auxiliary layer is constituted by at least two auxiliary plies comprising one auxiliary ply which is located on a radially innermost side and covers the belt layer over an entire width thereof, and at least a radially outermost auxiliary ply is discontinued at locations overlapping the circumferential main grooves.

3. The pneumatic radial tire according to claim 1, wherein the belt layer consists of at least two belt plies containing cords made of non-expandable organic fibers arranged at a shallow angle with respect to the equatorial plane of the tire while the cords in one of at least two belt plies are crossed to those in adjacent one, and the auxiliary plies contain cords made of thermally shrinkable cords arranged substantially in parallel to the equatorial plane of the tire.

4. The pneumatic radial tire according to claim 3, wherein a number of the cords per unit width in the auxiliary belt layer as viewed in a section orthogonal to the equatorial plane of the tire is increased in the order of regions corresponding to the circumferential main grooves of the tread, regions corresponding to the land portions between the adjacent circumferential main grooves, and a region corresponding to the land portions adjoining each of the edges of the tread.

5. The pneumatic radial tire according to claim 4, wherein a base rubber is arranged radially inside the tread and radially on an outer side of the belt layer, said base rubber has a 100% elongation modulus and a resilience both being higher than those of a rubber of the tread.

6. The pneumatic radial tire according to claim 5, wherein the base rubber is provided in a thickness of 1-2 mm radially on the auxiliary layer excluding shoulder portions of the tread over 65-80% of the width of the tread, centering around the equator of the tire.

7. The pneumatic radial tire according to claim 6, wherein the base, rubber layer has the 100% elongation modulus of 20-40 kg/cm$^2$ and the resilience of not less than 20%.

8. The pneumatic radial tire according to claim 7, wherein the tread rubber layer has the 100% elongation modulus of 10-30 kg/cm$^2$ and the resilience of 10%-30%.

9. The pneumatic radial tire according to claim 1, wherein plural rows of blocks are defined by providing a number of lateral grooves passing through the circumferential main grooves and extending substantially in parallel to one another, the belt layer comprises at least two belt plies containing non-expandable cords arranged at a shallow angle with respect to the equatorial plane of the tire while the cords of one of the belt plies are crossed to those of adjacent one, the auxiliary layer contains thermally shrinkable cords arranged substantially parallel to the equatorial plane of the tire, and an initial modulus per unit width of the auxiliary layer is greater at portions substantially corresponding to rows of the blocks located in an axially central portion of the tire and axially opposite ends of the tire than at least a portion corresponding to the adjacent circumferential main grooves.

10. The pneumatic radial tire according to claim 9, wherein a number of the auxiliary plies is greater at the portions corresponding to the land portions located in an axially central portion of the tire and axially opposite ends of the tire than that at the portions corresponding to the adjacent circumferential main grooves.

11. The pneumatic radial tire according to claim 9, wherein the circumferential rigidity of the portions corresponding to all the circumferential main grooves is smaller than that of portions corresponding to the adjacent respective land.portions.

12. The pneumatic radial tire according to claim 9, wherein cords arranged in the auxiliary layer at the portions corresponding to the land portions have a modulus greater than that of cords arranged at the portions corresponding to the land portions.

13. The pneumatic radial tire according to claim 9, wherein the auxiliary layer is formed by spirally winding a thermally shrinkable cord around an outer periphery of the belt layer in a direction substantially parallel to the equator of the tire, and the spiral winding is effected under application of higher tension for the portions corresponding to the land portions as compared with that for the portions corresponding to the circumferential main grooves.

14. The pneumatic radial tire according to claim 9, wherein the auxiliary layer is formed by spirally winding a thermally shrinkable cord around an outer periphery of the belt layer in a direction substantially parallel to the equator of the tire, and a distance between adjacent cords is greater at the portions corresponding to the land portions than that at the portions corresponding to the circumferential main grooves.

15. The pneumatic radial tire according to claim 9, wherein the auxiliary layer is formed by spirally winding a thermally shrinkable cord around an outer periphery of the belt layer in a direction substantially parallel to the equator of the tire such that the cord is spirally wound in an overlapped fashion at the portions corresponding to the land portions.

16. The pneumatic radial tire according to claim 13, wherein the auxiliary layer is formed by spirally winding a rubberized cord member containing a plurality of thermally shrinkable cords around the outer periphery of the belt layer in a direction substantially parallel to the equator of the tire.

17. The pneumatic radial tire according to claim 14, wherein the auxiliary layer is formed by spirally winding a rubberized cord member containing a plurality of thermally shrinkable cords around the outer periphery of the belt layer in a direction substantially parallel to the equator of the tire.

18. The pneumatic radial tire according to claim 15, wherein the auxiliary layer is formed by spirally winding a rubberized cord member containing a plurality of thermally shrinkable cords around the outer periphery of the belt layer in a direction substantially parallel to the equator of the tire.

19. The pneumatic tire according to claim 1, wherein the circumferentially rigidity of the portions corresponding to all the circumferential main groove is smaller than that of portions corresponding to the adjacent land portions.

20. A high performance pneumatic radial tire comprising; a toroidal carcass, a tread radially outside a crown portion of the carcass ad having at least two circumferential main grooves, a belt layer interposed between the carcass and the tread and having substantially a same width of the tread, an auxiliary layer arranged between the belt layer and radially inwardly of groove bottoms of said circumferential main grooves and covering the entire belt layer, said auxiliary layer constituted by at least two auxiliary plies comprising one auxiliary ply which is located on a radially innermost side and covers the belt layer over an entire width thereof, and at least a radially outermost auxiliary ply which is discontinuous at locations overlapping the circumferential main grooves, organic cords of the auxiliary layer being buried substantially parallel to an equatorial plane of the tire, and land portions being defined between at least two of said circumferential main grooves formed in an outer surface portion of the tread and between the circumferential main grooves and axially opposite edges of the tread, wherein circumferential rigidity of portions of the auxiliary layer corresponding to the circumferential main grooves is smaller than that of at least a portion of said auxiliary layer corresponding to land portions in an axially central portion of said tread and axially opposite edges of said tread.

21. The pneumatic tire according to claim 20, wherein the circumferential rigidity of the portions corresponding to all the circumferential main grooves is smaller than that of portions corresponding to the adjacent respective land portions.

22. A high performance pneumatic radial tire comprising; a toroidal carcass, a tread radially outside a crown portion of the carcass and having at least two circumferential main grooves, a belt layer interposed between the carcass ad the tread, an auxiliary layer arranged between the belt layer and radially inwardly of groove bottoms of said circumferential main grooves, said auxiliary layer comprising thermally shrinkable organic cords buried substantially parallel to an equatorial plane of the tire under land portions defined between at least two of said circumferential main grooves formed in an outer surface portion of the tread and between the circumferential main grooves and axially opposite edges of the tread, wherein circumferentially rigidity of those portions of the auxiliary layer corresponding to the circumferential main grooves is smaller than that of all portions of said auxiliary layer corresponding to land portions located between said main grooves in an axially central portion of the tread and land portions in axially opposite edges of the tread.

23. The pneumatic tire according to claim 22, wherein the circumferentially rigidity of the portions corresponding to all the circumferential main groove is smaller than that of portions corresponding to the adjacent land portions.

* * * * *